(12) United States Patent
Shen et al.

(10) Patent No.: US 6,956,902 B2
(45) Date of Patent: Oct. 18, 2005

(54) METHOD AND APPARATUS FOR A MULTI-USER VIDEO NAVIGATION SYSTEM

(75) Inventors: Bo Shen, Fremont, CA (US); Susie Wee, San Carlos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 683 days.

(21) Appl. No.: 09/977,099

(22) Filed: Oct. 11, 2001

(65) Prior Publication Data

US 2003/0072372 A1 Apr. 17, 2003

(51) Int. Cl.$^7$ .............................................. H04N 7/18
(52) U.S. Cl. ............................. 375/240.16; 375/240.26
(58) Field of Search ....................... 375/240.12–240.29

(56) References Cited

U.S. PATENT DOCUMENTS

| | | | |
|---|---|---|---|
| 5,821,986 A * | 10/1998 | Yuan et al. ............... | 348/14.12 |
| 6,108,448 A * | 8/2000 | Song et al. .................. | 382/235 |
| 6,614,936 B1 * | 9/2003 | Wu et al. .................... | 382/238 |
| 6,680,976 B1 * | 1/2004 | Chen et al. ............ | 375/240.26 |
| 2002/0071485 A1 * | 6/2002 | Caglar et al. .......... | 375/240.01 |
| 2003/0031128 A1 * | 2/2003 | Kim et al. ................... | 370/229 |
| 2003/0086622 A1 * | 5/2003 | Gunnewiek et al. ........ | 382/240 |
| 2003/0212742 A1 * | 11/2003 | Hochmuth et al. ......... | 709/204 |

\* cited by examiner

*Primary Examiner*—Andy Rao

(57) ABSTRACT

A method for video navigation. Specifically, one embodiment of the present invention discloses a method of video presentation whereby multiple users can each view and navigate cropped windows of a live-captured or stored video sequence in compressed form. A video sequence is captured from a stationary camera. An uncompressed version and compressed version following a compression format are captured. In response to user requests, cropped windows can be navigated from one location to another within the dimensions of the video sequence. For each cropped window, data from the compressed and compressed versions are combined to generate a portion of the video sequence that is in the same compression format. Whenever possible, data from the compressed version is used, and data from the uncompressed version is substituted when necessary to generate each portion of video sequence. Transmission of each portion of video sequence to the various requesting client devices occurs contemporaneously.

34 Claims, 7 Drawing Sheets

METHOD AND APPARATUS FOR A MULTI-USER VIDEO NAVIGATION SYSTEM

TECHNICAL FIELD

The presently claimed invention relates to the field of video transmission systems. More specifically, the presently claimed invention relates to a multi-user video navigation environment.

BACKGROUND ART

Video transmission systems present a video stream of data. Each video stream contains a sequence of individual picture frames that each contain a still image. When the picture frames are shown together sequentially, a video sequence of picture frames is presented. Transmission of a single video sequence can occur over a communication network to a single client device or multiple client devices.

Heretofore, functional control over transmission of the video sequence was only possible through a single controlling device. For example, a conventional approach can provide multiple users with navigational functionality. However, only a single user is allowed to have functional control over transmission of the video sequence. In one case, the controlling user can specify the position of the source camera to determine content of the video sequence. The captured video sequence is then compressed with compression hardware or software and transmitted to the multiple client devices displaying the video sequence.

In addition, further processing of the video sequence, e.g., resizing of the transmitted video sequence, is again controlled by a single device. As such, multiple client devices receiving transmission of the video sequence all display the same video sequence.

The aforementioned approach to controlling functionality over transmission of the video sequence is not scalable to multiple users. Only one user can control the content of the transmitted video sequence. The remaining client devices receiving transmission of the video sequence are essentially dummy devices that have no functional control over the transmission of the video sequence. As such, all the client devices are limited to the view determined by the position of the camera, which can only be controlled by one client device at a time.

Thus, a need exists for overcoming singular functional control of video presentation for a video sequence. Another need exists for scalable functional control of video presentation for a video sequence.

DISCLOSURE OF THE INVENTION

The present invention provides a method and system for multi-user video navigation. One embodiment of the present invention provides a method that achieves the above accomplishment and which also provides for overcoming the singular functional control of video presentation for a video sequence. Additionally, one embodiment of the present invention provides a method that achieves the above accomplishments and which also provides for scalable functional control of video presentation over a video sequence.

Specifically, one embodiment of the present invention discloses a method of video presentation whereby multiple users can each view and navigate cropped windows of a live-captured or stored video sequence in compressed form. A video sequence is captured from a stationary camera. For live captured video, an uncompressed version and compressed version following a compression format are captured. For stored video, a decoder or digitizer module replaces the capture module to obtain the pixel domain information. In response to user requests, cropped windows can be navigated from one location to another within the dimensions of the video sequence. For each cropped window, information data from the compressed and compressed versions are combined to generate a windowed portion of the video sequence that is in the same compression format. Whenever possible, data from the compressed version is used, and data from the uncompressed version is substituted when necessary to generate each windowed portion of video sequence. Transmission of each windowed portion of the video sequence to the various requesting client devices occurs contemporaneously.

These and other technical advantages of the present invention will no doubt become obvious to those of ordinary skill in the art after having read the following detailed description of the preferred embodiments which are illustrated in the various drawing figures.

BEST MODES FOR CARRYING OUT THE INVENTION

Figure 1:
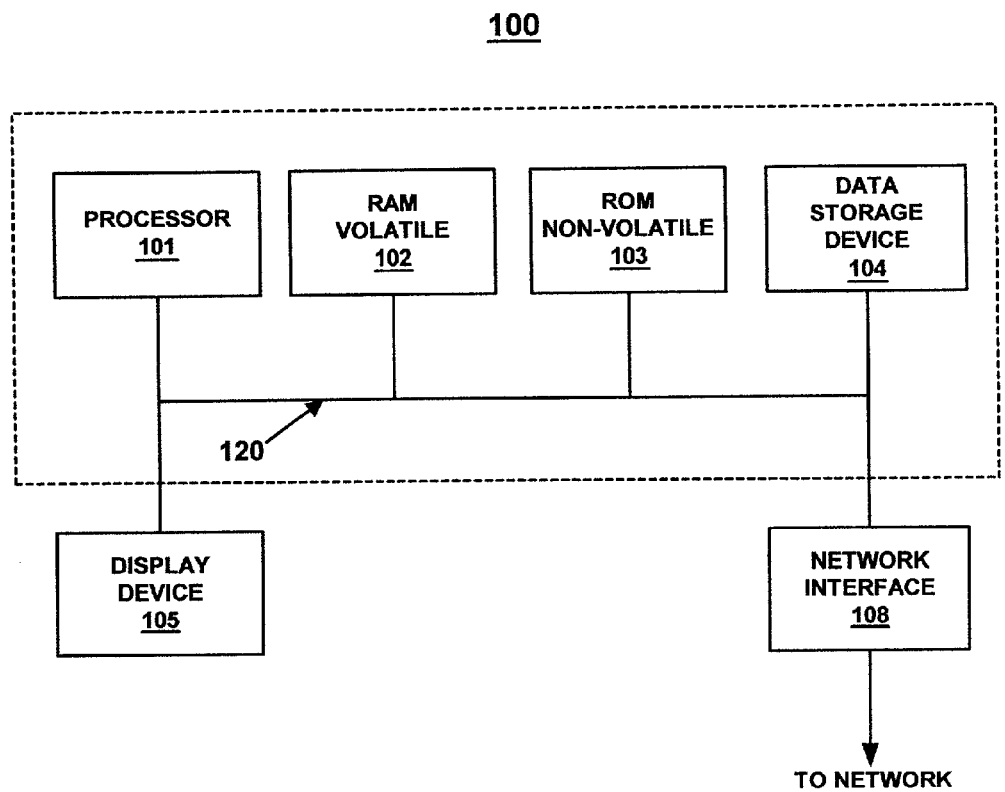
FIG. 1 illustrates a block diagram of an exemplary electronic device capable of providing multiple and navigable windows in a video sequence, in accordance with one embodiment of the present invention.

Reference will now be made in detail to the preferred embodiments of the present invention, a method for providing multiple and navigable portions of a video sequence, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Notation and Nomenclature

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "forming," or "generating," or "cropping," or "navigating," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Computer System Environment of the Present Invention

Referring now to FIG. 1, portions of the present invention are comprised of computer-readable and computer-executable instructions which reside, for example, in computer-readable media of an electronic system 100 that is capable of generating multiple and movable portions of a video sequence. FIG. 1 is a block diagram of interior components of an exemplary electronic system 100, upon which embodiments of the present invention may be implemented.

FIG. 1 illustrates circuitry of an exemplary electronic system 100. Exemplary electronic system 100 includes an address/data bus 120 for communicating information, a central processor 101 coupled with the bus 120 for processing information and instructions, a volatile memory 102 (e.g., random access memory (RAM), static RAM dynamic RAM, etc.) coupled with the bus 120 for storing information and instructions for the central processor 101, and a non-volatile memory 103 (e.g., read only memory (ROM), programmable ROM, flash memory, EPROM, EEPROM, etc.) coupled to the bus 120 for storing static information and instructions for the processor 101.

Exemplary electronic system 100 also includes a data storage device 104 (e.g., memory card, hard drive, etc.) coupled with the bus 120 for storing information and instructions. Data storage device 104 can be removable. Exemplary electronic system 100 also contains an optional electronic display device 105 coupled to the bus 120 for displaying information to a user. The display device 105 utilized with the electronic system 100 may be a liquid crystal device, cathode ray tube (CRT), field emission device (FED, also called flat panel CRT) or other display device.

With reference still to FIG. 1, a signal Input/Output device 108 which is coupled to bus 120 for providing a communication link between electronic system 100 and a wired or wireless network environment is described. As such, signal Input/Output device 108 enables the central processor unit 101 to communicate with or monitor other electronic systems, e.g., client devices displaying viewing windows, coupled to a communication network.

General Method and System for Multi-User Video Navigation Through a Video Sequence As an overview, embodiments of the present invention provide a method and system for multi-user video navigation through a video sequence. The present invention further provides a method and system that overcomes the singular functional control of video presentation for a video sequence by generating multiple viewing windows in a video sequence. Additionally, the present invention provides a method and system for functional control of video presentation over a video sequence that is scalable.

Figure 2:
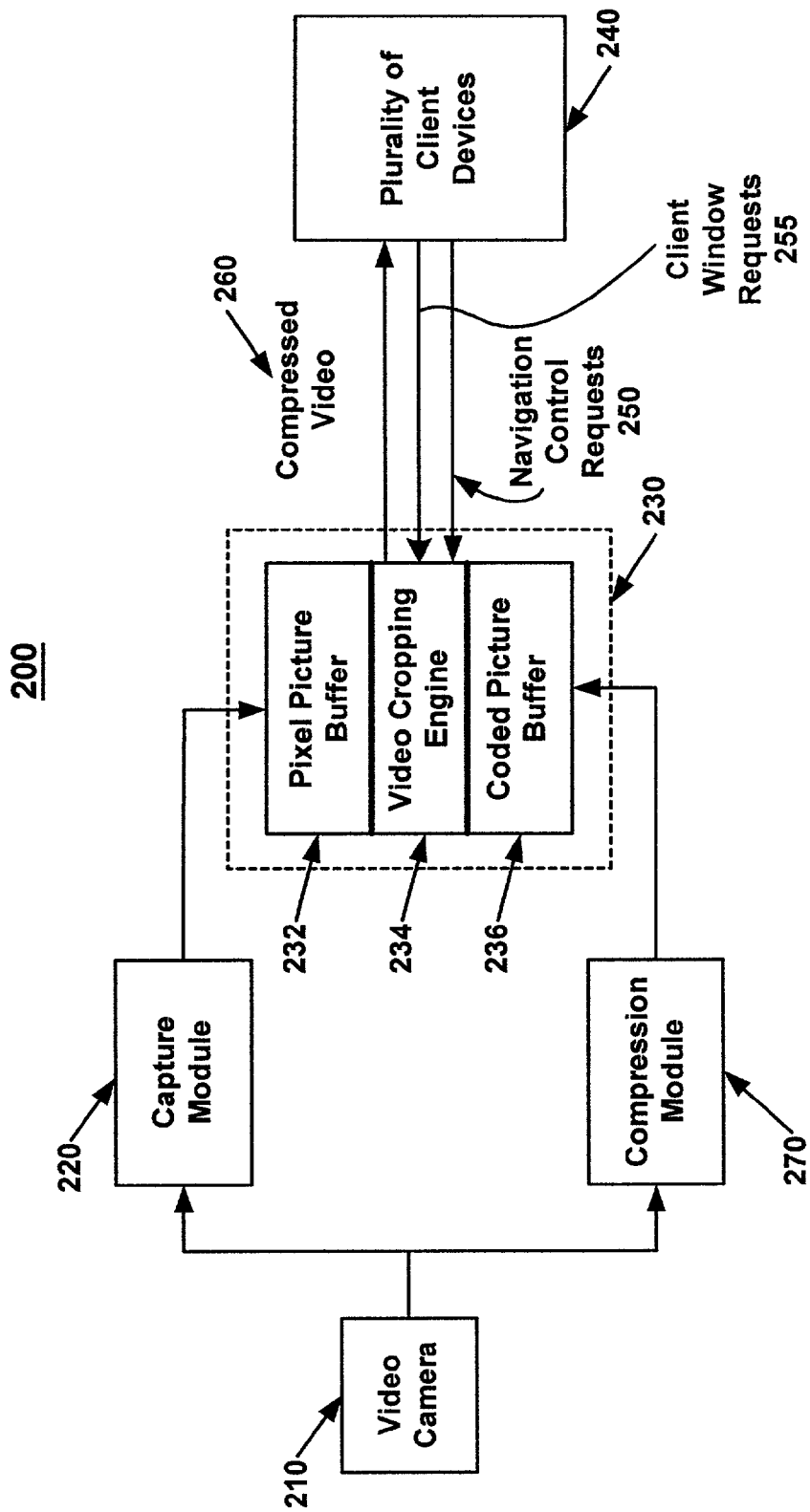
FIG. 2 illustrates a diagram of an exemplary communication system capable of capturing a video sequence and providing multiple and navigable windows of the video sequence to a plurality of client devices, in accordance with one embodiment of the present invention.
Figure 7:
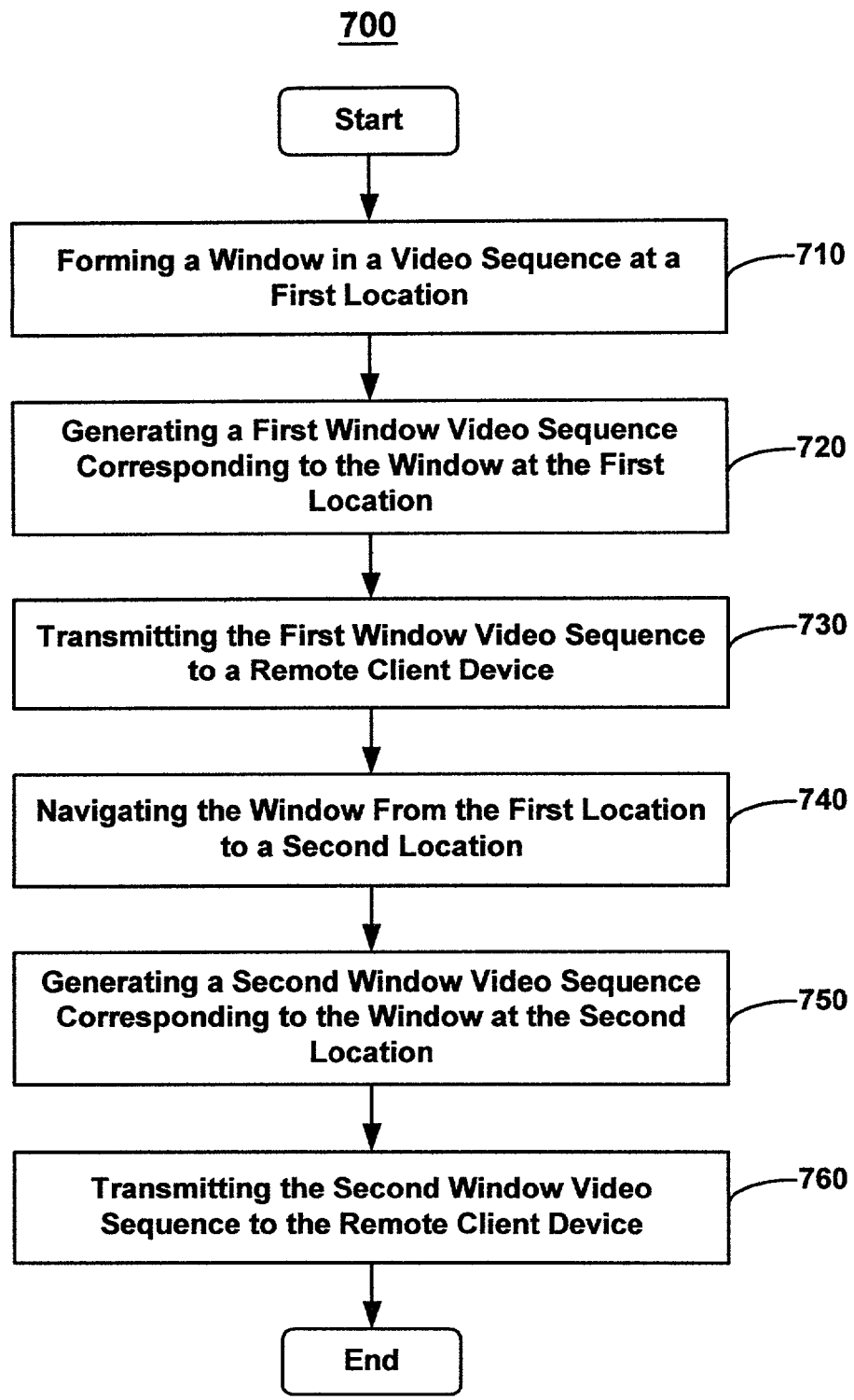
FIG. 7 is a flow diagram illustrating steps in a method for generating a window in a video sequence and navigating the window to a second location in the video sequence, in accordance with one embodiment of the present invention.

With reference now to FIG. 2 and flow chart 700 of FIG. 7, exemplary steps used by the various embodiments of the present invention are illustrated. Flow chart 700 includes processes of the present invention which, in one embodiment, are carried out by a processor under the control of computer-readable and computer executable instruction. The computer-readable and computer-executable instructions reside, for example, in data storage features such as computer usable volatile memory 102, computer usable non-volatile memory 103, and/or data storage device 104 of FIG. 1. The computer-readable and computer executable instructions are used to control or operate in conjunction with, for example, central processing unit 101 of FIG. 1.

With reference again to FIG. 2, a diagram of an exemplary communication system 200 capable of capturing a video sequence and providing multiple and navigable windows of the video sequence to a plurality of client devices that are remotely located as employed in conjunction with various embodiments of the present invention is shown. The communication system 200 allows one or more client devices to display portions of a video sequence that is live-captured or stored.

The system 200 contains a single and stationary video camera 210, a video capturing module 220, a video compression module 270 and a server 230. The video camera captures a high-resolution, full-sized video sequence having dimension in the x and y axis, in accordance with one embodiment. The original video sequence contains a sequence of individual picture frames, wherein each frame contains a still image. When the picture frames are shown together sequentially, the video sequence of picture frames is presented.

In the case of live-captured video, the capturing module 220 samples the signal from the video camera and produces pixel information for each frame of the video sequence forming a captured video stream. Essentially, the video stream produced by the capture module 220 is an uncompressed version of the original video sequence. On the other hand, the compression module 270 separately encodes and produces compressed bit streams of the original video sequence, forming a compressed video stream.

For stored video, a decoder or digitizer module (not shown) replaces the capture module 220 to obtain the digital domain pixel information. The resulting video stream produced by the decoder or digitizer module is an uncompressed version of the original video sequence.

The captured video sequence and the compressed video stream must be synchronized appropriately. In the least complicated situation, the compression module 270 allows the input signal of uncompressed video frames from the video camera 210 to be passed through separately for processing. Otherwise, in one embodiment, if the compression module 270 does not allow such a pass-through, then a separate hardware video capture unit (e.g., the capture module 220) must be used and synchronized with the compressed bit stream.

The server 230 contains a pixel picture buffer 232, a coded picture buffer 236, and a video cropping engine 234 that are coupled together. The server 230 is responsible for receiving the control requests from client devices and generating the compressed video bit streams for the portions of the original video sequence that are transmitted to the requesting client devices. For every reconstructed portion of the video sequence, the transmitted compressed bit stream represents a smaller sized video sequence, which is a windowed portion of the full-sized video sequence.

As mentioned above, in the following discussion, the term "server" is in various embodiments intended to encompass a device functionally resembling a computer (e.g., having computation ability, memory, and/or connectivity capability). A typical server according to the definition as used in the present application may include, but is not limited to, any computer (e.g., mainframe, corporate server, personal computer (PC), laptop, and the like).

Contained within the server 230, the pixel picture buffer 232 receives the output from the capture module 220, the uncompressed version of the original video sequence. The coded picture buffer 236 receives the output from the compression module 270, the compressed version of the original video sequence.

With reference now to FIG. 7, flow chart 700 illustrates steps performed in accordance with one embodiment of the present invention are shown. Although flow chart 700 describes steps that are associated with one window in a video sequence, the steps in flow chart 700 are applicable in supporting multiple windows in a video sequence that are independently generated and navigated.

In step 710 of flow chart 700, the present embodiment forms a window in a video sequence. The window is formed in response to a user request (e.g., request 255) specifying the size of the window and the location of the window within the dimension of the video sequence. For purposes of discussion regarding flow chart 700, the window is located at a first location within the dimension.

User requests are communicated via respective client devices 240 that are coupled to the server 230. For example, each of the client requests 255 of FIG. 2 specifies a window size and window location within the video sequence that corresponds to a generated portion of the original video sequence. In one embodiment, the server 230 receives those requests and generates bit streams containing portions of the original video sequence corresponding to the requested cropped windows. The present embodiment then compresses the generated bit streams in the same compression format used in the compression module 270 and transmits the compressed bit streams to respective requesting client devices.

In step 720, the present embodiment generates a first window video sequence that corresponds to the window at the first location. In step 720, the present embodiment, through the video cropping engine 234, crops the video sequence to generate the first window video sequence. Cropping of the video sequence into the requested portions is accomplished by extracting and combining respective portions of the uncompressed and compressed versions of the original video sequence. A second compression operation is performed on the uncompressed portion to code the uncompressed portion to the compression format used by the compression module 270.

Since each frame of the transmitted windowed video sequence is a partial scene or a portion of the original video sequence, the video cropping engine 234 can parse the compressed bit stream coming from the compression module 270 and extract those parts that can be reused. This exploits the already compressed bit stream that is calculated by the original compression operation at the compression module 270. In one embodiment, selection of the appropriate blocks of information from the original compressed bit stream is accomplished in real time in order to synchronize with the pixel-domain frames processed at the capture module 220.

Thereafter, the present embodiment parses information or data from the uncompressed version of the video sequence to complete the first window video sequence. Data from the uncompressed version is coded in an intra mode in order to comply with the compression format used by the compression module 270, in accordance with one embodiment.

In a multi-user environment, the original video sequence can be independently cropped into a plurality of cropped portions. Each of the cropped portions correspond to individually generated cropped windows and in one embodiment contemporaneously transmitted to their corresponding client devices, in step 730.

The term "contemporaneously" in this Application is defined as occurring coincidentally, jointly, concurrently, almost simultaneously, or the like, such that each of the corresponding client devices are receiving and viewing their respective cropped window video sequences during the same period of time.

In step 740, the present embodiment navigates the window from the first location to a second location within the dimension of the video sequence. The navigation is in response to a navigation request 250 communicated from the remotely located client device. The present embodiment provides a means for users of client devices to individually navigate and view different portions of the video sequence by controlling the navigation offset and size of their respective windows.

In step 750, the present embodiment generates a second window video sequence that corresponds to the window at the second location. In the multi-user environment, the present embodiment in step 750 crops the video sequence into the windowed portions by extracting and combining respective portions of the uncompressed and compressed versions of the original video sequence.

Again, a second compression operation is performed on the uncompressed portion to code the uncompressed portion into the compression format used by the compression module 270 in one embodiment. As discussed previously, the video cropping engine 234 can parse the compressed bit stream coming from the compression module 270 and extract those parts that can be reused. This exploits the already compressed bit stream that is calculated by the original compression operation at the compression module 270.

In addition, selections of the first window video sequence that are in compliance with the compression algorithm for the requested window size and location are also reused. Specifically, the present embodiment extracts prediction information from the first window video sequence that are based on blocks contained within the window at the second location. Reference blocks that comply with the compression format used in module 270 for the window in the second location can be reused by implementing an adjusted motion vector. The adjusted motion vector is the vector sum of the navigation step vector and the old motion vector, as will be further discussed.

Thereafter, information from the uncompressed version of the video sequence is intra coded in the compression format used by the compression module 270 and substitutes the aforementioned information to complete the second window video sequence. In step 760, the present embodiment transmits the second window video sequence to the requesting client device. The client device is remotely located from the server 230.

One embodiment of the present invention is scalable to multiple users and provides each user with individual navigational functionality and control through efficient video compression and processing algorithms implemented in hardware and/or software. In this manner, individual navigational control over each of the cropped windows determines which part of the original video sequence is displayed to each of the requesting users at their respective client devices.

In another embodiment of the present invention, a single hardware or software compression of the high resolution sequence is separately performed. As such, a compressed version of the single high-resolution video sequence is generated. In this way, a compressed version and an uncompressed version of the high-resolution video sequence is created. The resulting compressed bit stream and the captured video frames are combined to generate a new compressed bit stream for each portion of the video sequence that is transmitted to client devices. Each of the transmitted bit streams contains a requested window of the video sequence as requested by the user. This embodiment achieves improved computational performance by exploiting the coded information as calculated by the original compression operation.

If a hardware compression unit is used, only one viewpoint can be compressed per hardware compression unit. However, if a software compression is used, the supported number of viewpoints will be determined by the computing power of the electronic device, e.g., device 100. In essence, one software encode operation is needed for each window.

Figure 3:
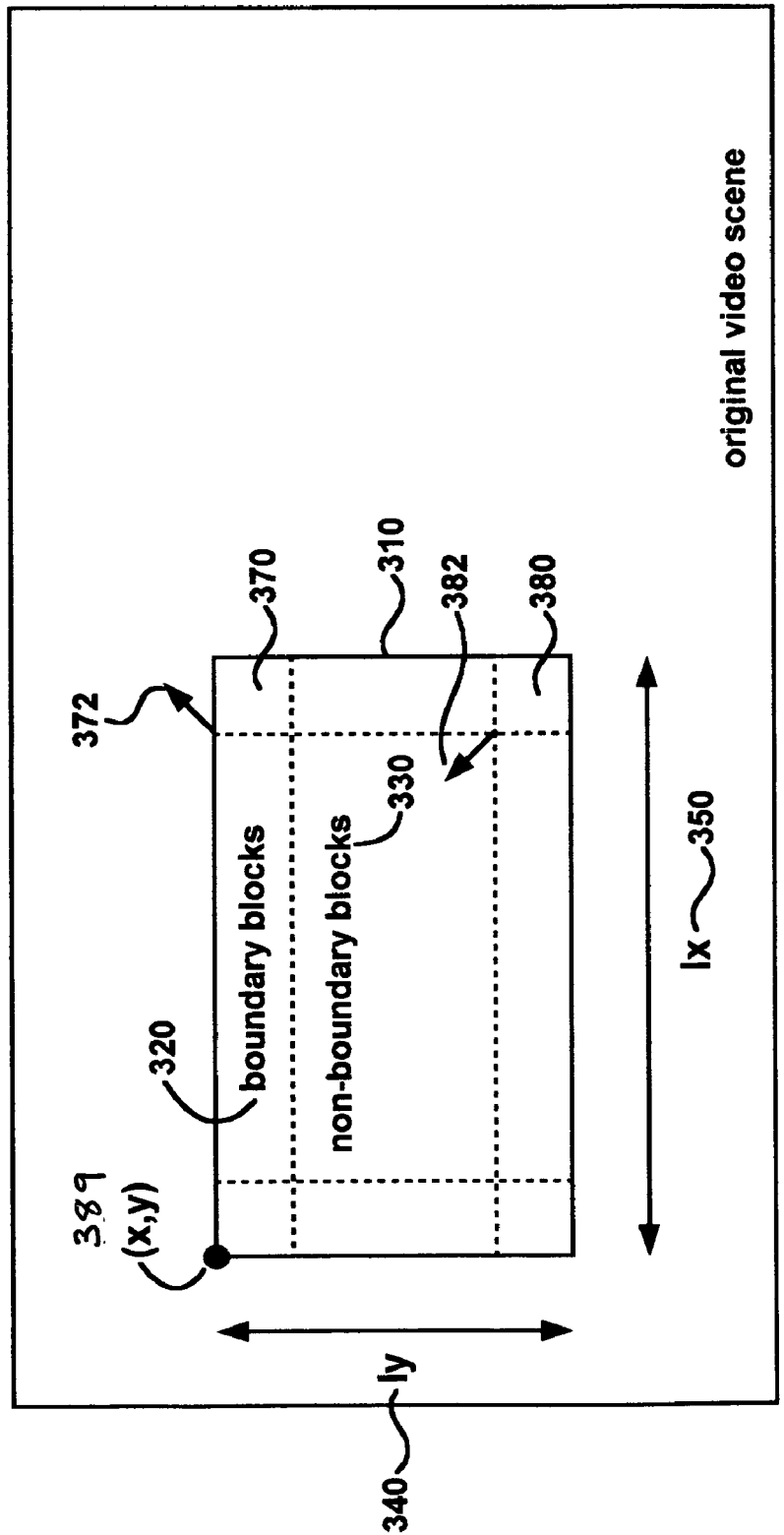
FIG. 3 illustrates a block diagram of an exemplary frame in a video sequence showing a cropped window, in accordance with one embodiment of the present invention.
Figure 5:
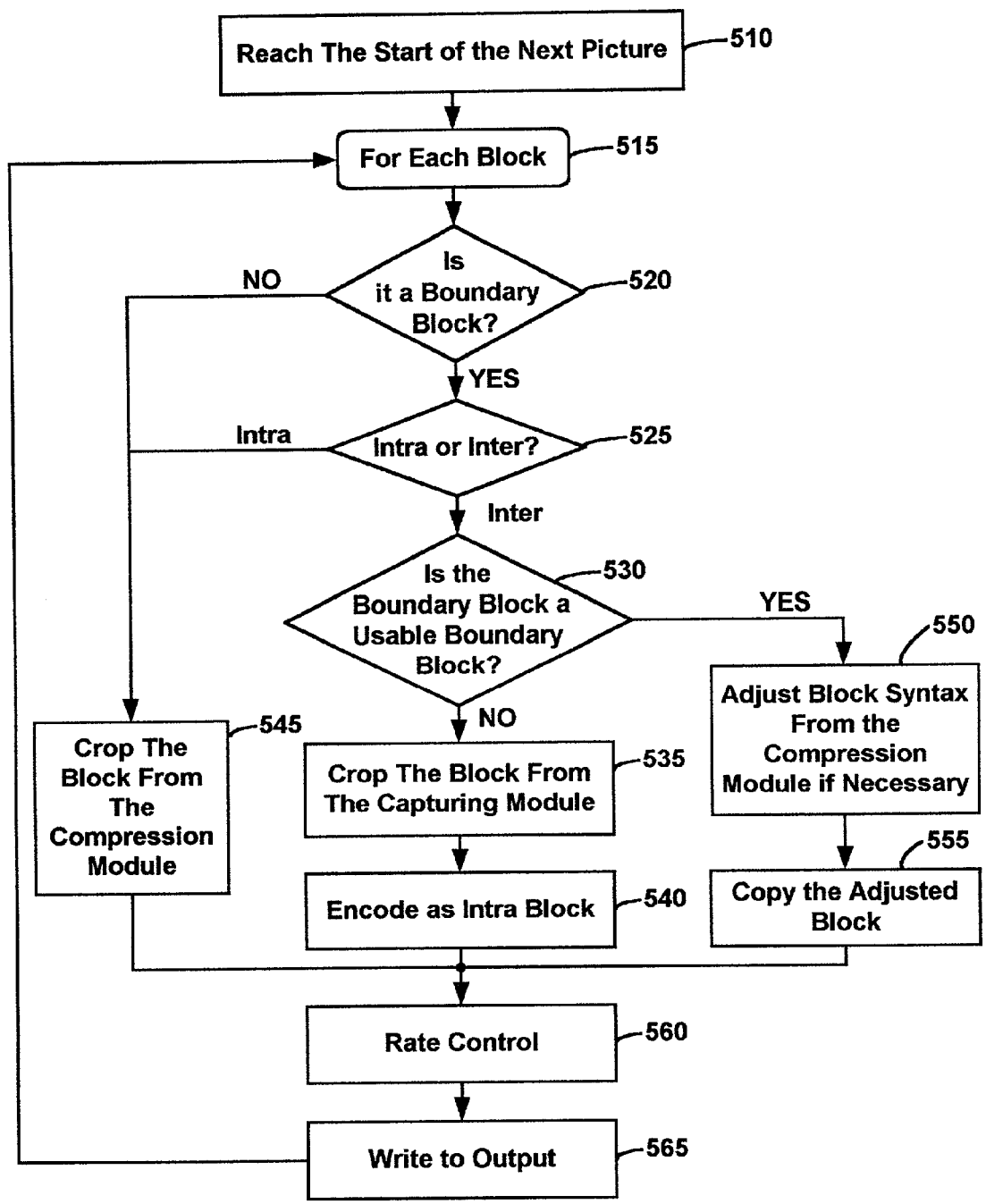
FIG. 5 is a flow diagram illustrating steps in a method for generating a compressed video stream for a portion of a video sequence that corresponds to a stationary window in said video sequence, in accordance with one embodiment of the present invention.

With reference now to the flow chart 500 of FIG. 5 and FIG. 3, steps for generating a bit stream that corresponds to a windowed portion of an original video sequence are shown, in accordance with one embodiment of the present invention. The window described in conjunction with flow chart 500 is stationary.

FIG. 3 illustrates a block diagram of an exemplary frame 300 at time "t" in the original video sequence that shows a single cropped window 310, in accordance with the present embodiment. In flow chart 500, the cropped window 310 is not moving between frames (e.g., time "t" and "t+1") of the original video sequence. The frame 300, and correspondingly the original video sequence, has dimension in the x and y axis. Also, the cropped window 310 has dimension within the frame 300 as shown by the lengths $l_x$ 350 and $l_y$ 340 that defines a size for the cropped window 310. A reference point 389 defines the x and y coordinates for locating the relative position of the cropped window 310 within the dimensions of the frame 300.

Those well versed in the art understand that the frame 300 is broken down into unit blocks that are individually treated and compressed depending on the compression module 270 used. The unit blocks are divided into equally sized and non-overlapping blocks in the frame 300. For example, in accordance with one embodiment, the Moving Picture Expert Group (MPEG) video compression standard is used in the compression module 270. The unit block size for an MPEG video encoder is sixteen by sixteen (16×16) pixels. These unit blocks correspond to similarly positioned blocks within frames of the compressed uncompressed versions of the original version sequence.

Embodiments of the present invention incorporate a method of compression known to those in the art as block based motion compensation or block matching. During block matching, on an individual basis, each target block in the current frame (e.g., frame 300) is compared with a past frame (e.g., the frame at "t−1") in order to find a matching block or blocked area that is used as a replica. For purposes of this Application, the matching block is also referred to as a "reference block." The past frame has already been transmitted to the client device. When the current frame is reconstructed by the receiver at the client device, among other processes, this matching block is substituted for the target block in the current frame.

The search can be conducted throughout the entire dimension of the past frame; however, the search is usually restricted to a smaller search area that is centered around the position of the target block in the current frame (e.g., frame 300 at time "t"). This search area is called the motion vector search range. The motion vector search range places an upper limit on how far objects can move between frames to provide effective coding.

Once the best substitute, or matching block is found for the target block, a motion vector is calculated. The motion vector describes the location of the matching block from the past frame in relation to the position of the target block in the current frame. For coding efficiency, the difference between the target block and the matching block is then encoded along with the motion vector and transmitted to the client device.

The cropped window 310 is comprised of the same unit blocks that correspond to the blocks in the frame 300. The blocks in the cropped window 310 can be further classified as boundary blocks 320 and non-boundary blocks 330. The boundary blocks 320 are the blocks that are located on the boundary of the cropped window 310. As such, the boundary blocks are located on the edges or borders of the cropped window 310. In addition, the boundary blocks 320 have motion vectors that point to reference blocks that may lie, either partially or entirely, outside the cropped window 310. Non-boundary blocks 330 lie within a region that is surrounded by the boundary blocks 320 in the cropped window 310. Further, non-boundary blocks 330 have motion vectors that definitely point to reference blocks that lie entirely within the cropped window 310.

Boundary blocks 320 can be further defined as useable and non-useable boundary blocks. For example, in FIG. 3, block 370 lies on the edge of the cropped window 310 and has a motion vector 372 that points to a reference block (not shown) that lies outside of the cropped window 310. As such, block 370 is defined as a boundary block, and is further defined as a "non-useable" boundary block. Also, boundary block 380 has a motion vector 382 that points to a reference block (not shown) that lies entirely within the cropped window 310. As such, boundary block 380 is defined as a "useable" boundary block.

FIG. 5 is a flow chart illustrating the method for generating the compressed bit stream associated with the cropped window 310 in FIG. 3, in accordance with one embodiment of the present invention. Since the rendering of the generated compressed bit stream for the cropped window 310 must be done in real time, the information from the compression module (e.g., module 270 in FIG. 2) is used as much as possible.

While it is straightforward to reuse non-boundary blocks 330 in the middle of the cropped scene, reusing some of the boundary blocks 320 may pose a problem. Some boundary blocks 320 of the cropped viewing window 310 may need to be further coded in an intra mode in one embodiment. These boundary blocks, that are recorded in intra mode, originally have prediction dependencies based on image data that lie outside of the cropped viewing window 310. However, image data in blocks that lie outside of the cropped viewing window 310 is not transmitted in the windowed video bit stream. As such, boundary blocks transmitted with dependencies on nontransmitted image data cannot be recreated at the client device. Independently encoding those boundary blocks in the intra mode allows those boundary blocks to be displayed at the client device without any loss of data.

In generating the windowed video bit stream for the portion of the original video sequence that corresponds to the cropped window 310, the present embodiment begins the process outlined in flow chart 500 at the start of each frame in the original video sequence, in step 510. In FIG. 5, the process outlined in flow chart 500 repeats for every block within the cropped window 310, as is shown in step 515.

In step 520, the present embodiment determines if the block in question is a boundary block within the cropped window 310. As discussed previously, a boundary block lies on the edge of the cropped window and has prediction dependencies based on image data that may lie outside of the cropped viewing window 310.

If it is not a boundary block, the present embodiment proceeds to step 545 and crops the block from the compressed version generated by the compression module (e.g., module 270). Since the bit stream generated by the compression module is of the same compression format as the video bit stream that is transmitted to the client device, the present embodiment reuses or copies the part of the bit stream from the compression module pertaining to the block in question.

On the other hand, for boundary blocks where the motion vector is pointing outside of the cropped window 310, the block is independently coded in one embodiment. If necessary, pixel information for the boundary blocks can be obtained from the capturing module 220. Thus, the present embodiment determines if the boundary block, and correspondingly, the entire frame, is intra coded, in step 525. An intra coded frame (I-frame) can be reconstructed without any reference to other frames. In other words, intra coded frames are independently coded.

If the target boundary block is intra coded, then the present embodiment proceeds to step 545 and crops the target boundary block from the compressed bit stream generated by the compression module (e.g., module 270).

The present embodiment proceeds to step 530, if the target boundary block is inter-coded. Inter-coded P-frames contain blocks that are reconstructed with data from blocks in a previous frame. A predicted frame (P-frame) is forward predicted, in that a previous I or P frame is used to reconstruct the current frame. Inter-coded B-frames are both forward and backward predicted from the last or next I or P frame. The B-frames require at least two frames in order to reconstruct the target blocks from the current frame.

In step 530, the present embodiment determines if the reference block pointed to by the motion vector lies within the cropped window. In other words, in step 530, the present embodiment determines if the boundary block is useable or non-useable.

If the boundary block is non-useable, then the present embodiment proceeds to step 535 and crops information pertaining to the target boundary block from the uncompressed bit stream generated or passed by the capture module (e.g., module 220). Then the present embodiment encodes the information as an intra block in the compression format used by the compression module (e.g., module 270). In this way, the video bit stream transmitted to the client device maintains the integrity of its compression format.

On the other hand, if the boundary block is useable, then the present embodiment proceeds to step 550 and adjusts the syntax for the compressed bit stream from the compression module (e.g., module 270) if necessary. For a boundary block, as long as its motion vector points to a reference block that is entirely within the cropped window, that block information can also be reused.

However, certain syntax for the generated bit stream must be adjusted accordingly. For instance, when the output stream is generated as an MPEG sequence, a boundary block may be a skipped block. However, the MPEG sequence does not allow the first block of the window or frame to be a skipped block. While the block may be appropriately coded for the entire frame, when cropping to the window 310, the block at that time may not comply with the MPEG standard. In that case, the coding syntax for the skipped block must be adjusted to comply with the MPEG standard in step 550. Thereafter, the present embodiment copies the adjusted block in step 555.

In step 560, before sending the video bit stream to the client device, from steps 540, 545, and 555, the present embodiment quantizes the generated video bit stream for the cropped window (e.g., 310) by a rate control module (not shown). The bit rate of the cropped video bit stream should be adjusted and maintained. The rate control module adjusts the transmitted bit rate to reflect the capabilities of the networking environment and the client device. Since the windowed video has smaller resolution than that of the original video sequence, it should be coded in a smaller bit rate. The rate control is done on the compressed data obtained from the compression module. Adjusting the bit rate is accomplished before the generated video bit stream for the cropped window is written to the output in step 545.

Figure 4:
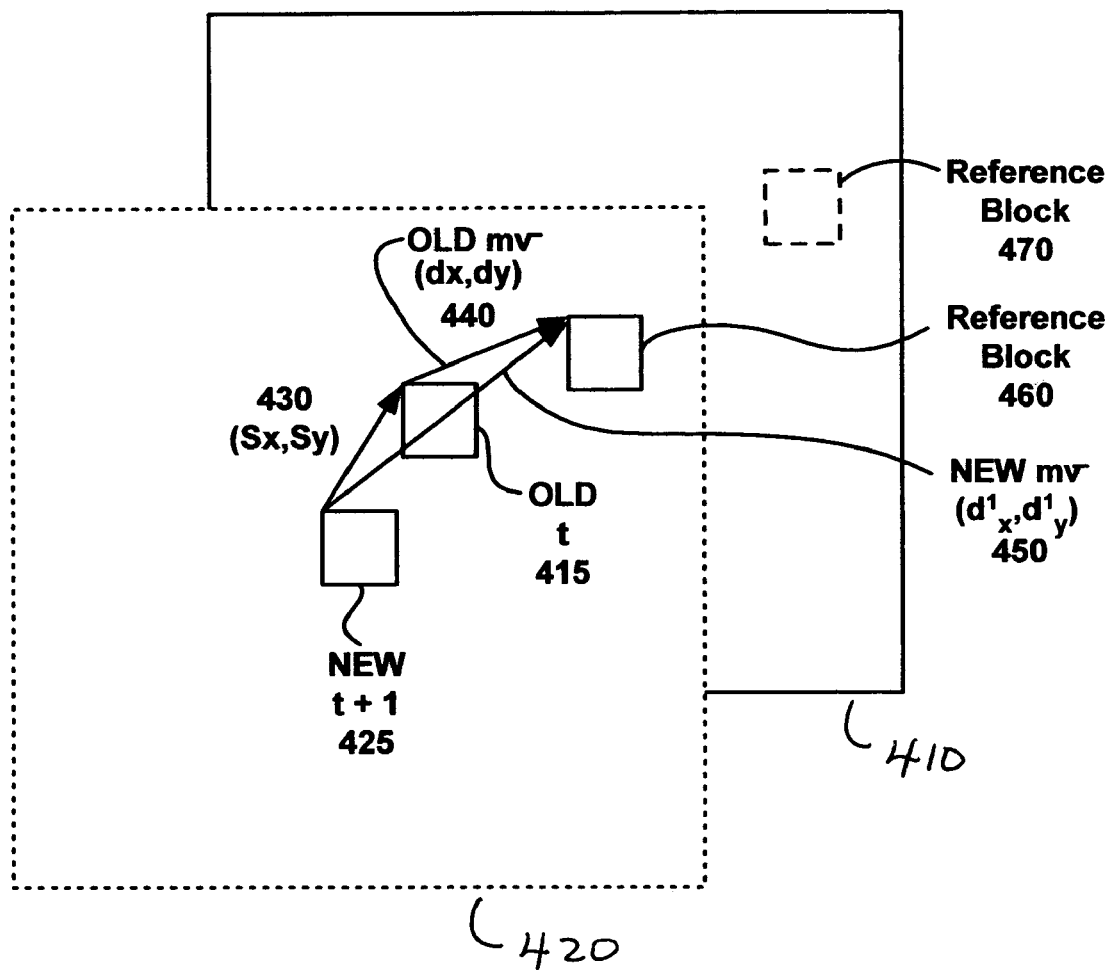
FIG. 4 is a diagram showing an exemplary adjusted motion vector for a block within a frame in a video sequence that has moved from a first location to a second location, in accordance with one embodiment of the present invention.
Figure 6:
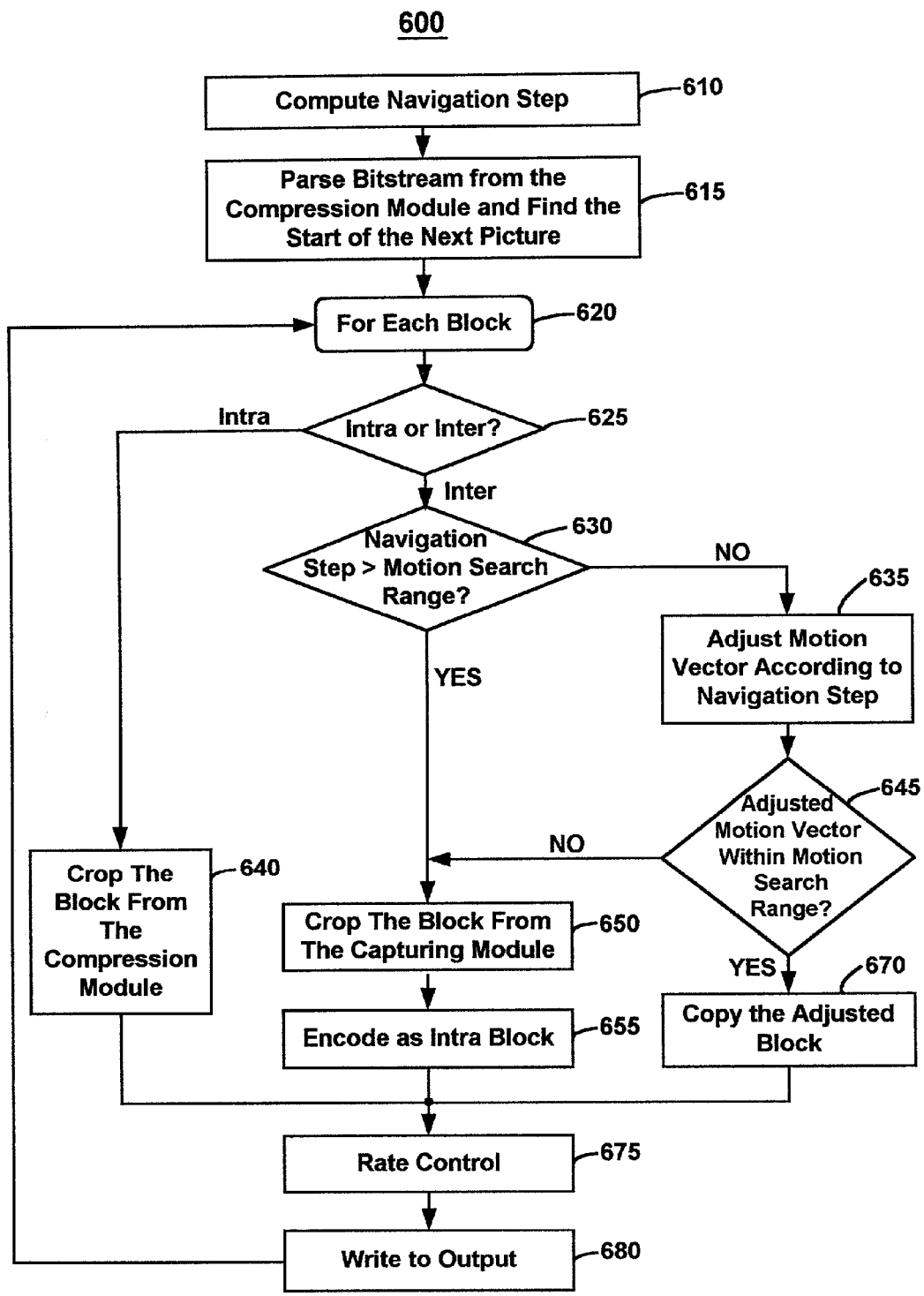
FIG. 6 is a flow diagram illustrating steps in a method for generating a compressed video stream for a portion of a video sequence that corresponds to a window that is navigating from a first location to a second location in said video sequence, in accordance with one embodiment of the present invention.

FIG. 6 is a flow chart that, in combination with FIG. 4, illustrates a method for generating the compressed bit stream at the moment an associated cropped window (e.g., window 310) is changing location within the original video sequence, in accordance with one embodiment of the present invention. While the user is moving a cropped viewing window from a first location to a second location within the dimensions of the original video sequence, there will be reference shifting during navigation of the cropped viewing window. In essence, the relative reference must be adjusted when navigation occurs during a prediction frame in order to reuse the motion information already generated by the compression module (e.g., module 270).

FIG. 4 is a block diagram illustrating the movement of a block in a cropped window (e.g., window 310) from an original video sequence from a first location in a frame at time "t" to a second location in a frame at time "t+1" In FIG. 4, at frame "t", the block is denoted as the "old" block 415. The new position of the same block in the viewing window at frame "t+1" is represented as "new" block 425.

The movement of the block represents the same movement of the cropped window as requested by the user, via a navigation control request, at a client device. A navigation step ($s_x$, $s_y$) 430 represents movement of the block, and the associated cropped window in one embodiment. The navigation step can be represented also as navigation step vector 430.

The navigation step size, representing the horizontal and vertical movement of the selected cropped scene, is a multiple of the size of whatever the motion estimation unit that is used in the compression module (e.g., module 270), in accordance with one embodiment of the present invention. For example, if the compression module is an MPEG video encoder, motion estimation is typically done in unit blocks of size sixteen pixels by sixteen pixels (16×16 pixels). As such, the navigation step size in the x and y coordinates is a multiple of 16 pixels.

In accordance with another embodiment, considering a viewing window shifting from time "t" to "t+1" as shown in FIG. 4, in general, if the frame at time t+1 is an intra frame, the new block 425 is cropped directly from the compression module. The information for the corresponding blocks coded from the compression module are copied to the output video bit stream to the client, since they are coded independently.

On the other hand, if the frame is a predicted frame, in order to reuse block information, an associated motion vector must be adjusted since there is shifting between the reference frame and the current frame (t+1) due to the navigation step 430, in accordance with one embodiment of the present invention. For example, the motion vector associated with the old block 415 points to a reference block 460. The reference block is within the "old" motion vector search range 410 and can be properly used.

Two conditions exist for reusing the blocks within the frames at time "t" in one embodiment. The first condition is that the adjusted motion vector is within the new motion vector search range (e.g., search range 420). In other words, the adjusted motion vector points to a reference block such that is the adjusted motion vector is within the new motion vector search range (e.g., search range 420). In one embodiment, the motion vector search range is within a set of [−16 pixels, +16 pixels] in both the x and y coordinates. The second condition is that any part of the reference block should not be outside of the cropped window at time "t."

In another embodiment, if the boundary of the cropped viewing window aligns with the boundary of the original scene of the original video sequence, the motion vector will always be within the range of the new motion vector search range. Therefore, information regarding those boundary blocks can always be reused. In accordance with another embodiment, navigations outside of the original scene are not possible.

Flow chart 600 of FIG. 6 shows the processing flow for the first frame when the position of the cropped viewing window is changed from one location to another, in accordance with one embodiment of the present invention. The user at a client device sends the location and size of the new viewing window in a navigation control request. The present embodiment computes the navigation step by obtaining the differences between the locations of the viewing window at time "t" and "t+1," in step 610.

In step 620 of flow chart 600, the present embodiment then waits until the next start of a picture frame, the frame at time "t+1," by looking into the coded picture buffer (e.g., buffer 236 in FIG. 2) which is filled by the compression module (e.g., module 270). The corresponding pixel data for the same picture should be contained in the pixel picture buffer (e.g., buffer 232) which is filled by the capturing module.

Thereafter, the present embodiment completes the following steps for each block as indicated in step 620. In condition step 620, the present embodiment determines if the block in question (block 425), and correspondingly, the entire frame, is intra coded. As discussed previously, an intra coded frame (I-frame) can be reconstructed without any reference to other frames.

For each compressed block in the picture, if it is independently coded, it can be used directly without any change. As such, if the block is intra coded, then the present embodiment proceeds to step 640 and crops the new block 425 from the compressed bit stream generated by the compression module (e.g., module 270).

The present embodiment proceeds to step 630, if the new block 425 is inter coded. As discussed previously, inter coded P-frames contain blocks that are reconstructed with data from blocks in a previous frame. Inter coded B-frames are both forward and backward predicted from the last or next I or P frame. The B-frames require at least two frames in order to reconstruct the target blocks from the current frame. In the present embodiment, a cropped window cannot be moved during the interpolated B-frames.

If it is predicted from the frame at time t, the present embodiment in flow chart 600 checks to see if the aforementioned conditions are satisfied in order to reuse the coded block in the frame at time "t+1." Otherwise, the corresponding pixel block is cropped from the pixel picture and encoded as an intra block.

In step 630, the present embodiment determines if the navigation step vector is greater than the motion vector search range.

The present embodiment in flow chart proceeds to step 650 if the navigation step vector is greater than the motion vector search range and crops information pertaining to the new block 425 from the uncompressed bit stream generated or passed by the capture module (e.g., module 220). Then, the present embodiment encodes the information as an intra block in the compression format used by the compression module (e.g., module 270). In this way, the video bit stream transmitted to the client device maintains the integrity of its compression format.

However, if the navigation step vector is not greater than the motion vector search range, then the present embodiment adjust the motion vector according the navigation step in step 635. For example, referring back to FIG. 4, in order to reuse the information coded in a predicted frame at time "t+1," the old motion vector 440 must be adjusted to reflect the new position of the new block 425 in relation to the same reference block 460. In other words, the new motion vector 450 is adjusted to the new position of the new block 425. The new adjusted motion vector can be computed using vector analysis. In one embodiment, the adjusted motion vector can be computed as the sum of the old motion vector ($d_x$, $d_y$) 440 and the navigation step vector ($s_x$, $s_y$) 430.

In x and y coordinates, the adjusted motion vector ($d'_x$, $d'_y$) can be computed as in the x and y coordinates, as follows:

$d'_x = d_x + s_x$ $d'_y = d_y + s_y$

In accordance with one embodiment of the present invention, the adjusted new motion vector must be within the motion vector search range 420 of the new block 425. In condition step 645, the present embodiment determines if the adjusted motion vector points to a reference block that is within the motion vector search range for the new block 425.

In the case where the adjusted motion vector is within the motion vector search range, the present embodiment copies the adjusted block in step 670. In FIG. 4, reference block 460 is within the motion vector search range 420 and can be used.

On the other hand, if the adjusted motion vector is not within the motion vector search range, then the present embodiment would proceed to step 650 as discussed previously. By way of example, if block 470 were to be used as a reference block, then block 470 would be outside of the motion vector search range 420 and could not be used. This is the case even though the block 470 was originally within the old motion vector search range 410.

In step 675, before sending the video bit stream to the client device, from steps 640, 655, and 670, the present embodiment quantizes the generated video bit stream for the cropped window by a rate control module (not shown). The bit rate of the cropped video bit stream should be adjusted and maintained. The rate control module adjusts the transmitted bit rate to reflect the capabilities of the networking environment and the client device. Since the windowed video has smaller resolution than that of the original video sequence, it should be coded in a smaller bit rate. The rate control is done on the compressed data obtained from the compression module. Adjusting the bit rate is accomplished before the generated video bit stream for the cropped window is written to the output in step 680.

While the methods of embodiments illustrated in flow charts 500, 600, and 700 show specific sequences and quantity of steps, the present invention is suitable to alternative embodiments. For example, not all the steps provided for in the method are required for the present invention. Furthermore, additional steps can be added to the steps presented in the present embodiment. Likewise, the sequences of steps can be modified depending upon the application.

A method for providing navigation for cropped viewing windows in a video sequence that are transmitted contemporaneously, is thus described. While the present invention has been described in particular embodiments, it should be appreciated that the present invention should not be construed as limited by such embodiments, but rather construed according to the below claims.

What is claimed is:

1. A method for video navigation comprising:
   a) forming a window in a video sequence having dimension corresponding to a first location within said dimension in response to a first request from a first client that is remotely located, wherein a size of said window is smaller than said dimension;
   b) generating a first window video sequence from said video sequence, wherein said first window video sequence corresponds to said window at said first location, said first window video sequence having a first compression prediction following a compression format;
   c) navigating said window from said first location to a second location in said dimension in response to a second request from said first client; and
   d) generating a second window video sequence from said video sequence, wherein said second window video sequence corresponds to said window at said second location, said second window video sequence having a second compression prediction following said compression format.

2. The method for video navigation as described in claim 1, wherein b) comprises:
   b1) extracting from a compressed version of said video sequence prediction information for said window video sequence that independently complies with said compression format for said window; and
   b2) substituting intra coded information that is coded from an uncompressed version of said video sequence in said compression format to complete said window video sequence.

3. The method for video navigation as described in claim 1, wherein d) comprises:
   d1) extracting from said first window video sequence prediction information based on blocks contained within said window at said second location for said second compression prediction; and
   d2) substituting intra coded information that is coded from an uncompressed version of said video sequence in said compression format to complete said second window video sequence.

4. The method for video navigation as described in claim 1, wherein d) comprises:
   referencing a reference block in said second window video sequence, said reference block associated with an adjusted motion vector by adding a navigation step vector to an associated motion vector.

5. The method for video navigation as described in claim 4, wherein d) further comprises:
   referencing said reference block if said reference block is within a new motion vector search range corresponding to said window at said second location.

6. The method for video navigation as described in claim 1, wherein said compression format is a Motion Picture Expert Group (MPEG) compression format.

7. The method for video navigation as described in claim 1, further comprising:
   sizing said first window within said dimension in response to said first request; and
   locating said first window at said first location in response to said first request.

8. The method for video navigation as described in claim 1, further comprising:
   transmitting said second window video sequence to said first client for viewing.

9. The method for video navigation as described in claim 1, further comprising:
   e) contemporaneously forming a second window corresponding to a third location within said dimension in response to a third request from a second client that is remotely located;
   f) contemporaneously generating a third window video sequence corresponding to said second window at said third location, said third window video sequence having a third compression prediction following said compression format; and
   g) contemporaneously transmitting said second and third window video sequences to said first and second clients respectively for viewing.

10. The method for video navigation as described in claim 1, further comprising:
   e) contemporaneously forming a second window corresponding to a third location within said dimension in response to a third request from a second client;
   f) contemporaneously navigating said second window from said third location to a fourth location in said dimension in response to a fourth request from said second client; and
   g) contemporaneously generating a fourth window video sequence corresponding to said second window at said fourth location, said fourth window video sequence having a fourth compression prediction following said compression format;
   h) contemporaneously transmitting said second and fourth window video sequences to said first and second clients for viewing.

11. A method for video navigation comprising:
   a) creating a plurality of windows within a video sequence having dimension in response to window requests from corresponding clients in a plurality of clients that are remotely located, each of said plurality of windows is associated with one of said plurality of clients and is of a size that is smaller than said dimension;
   b) for each of said plurality of windows, generating a window video sequence from said video sequence following a compression format corresponding to client defined size and location information within said dimension;
   c) independently navigating each of said plurality of windows throughout said dimension in response to navigation requests from said corresponding clients; and
   d) for each of said plurality of windows that is navigated to a new location, generating a new window video sequence following said compression format.

12. The method for video navigation as described in claim 11, further comprising:
   for each of said plurality of windows, contemporaneously transmitting said window video sequence; and
   for each of said plurality of windows that is navigated to a new location, contemporaneously transmitting said new window video sequence.

13. The method for video navigation as described in claim 11, wherein b) comprises:
   b1) extracting from a compressed version of said video sequence prediction information that independently complies with said compression format for each of said plurality of windows; and
   b2) substituting intra coded information that is coded from an uncompressed version of said video sequence in said compression format to complete said window video sequence for each of said plurality of windows.

14. The method for video navigation as described in claim 13, wherein b1) further comprises:
   incorporating independently coded information from said compressed version in said window video sequence.

15. The method for video navigation as described in claim 11, wherein d) comprises:
   d1) cropping said window video sequence for prediction information that independently complies with said compression format for each of said plurality of windows that is navigated; and
   d2) substituting intra coded information that is coded from an uncompressed version of said video sequence in said compression format to complete said window video sequence for each of said plurality of windows that is navigated.

16. The method for video navigation as described in claim 15, wherein d1) further comprises:
   incorporating independently coded information from said compressed version in said new window video sequence.

17. The method for video navigation as described in claim 11, wherein d) comprises:
   referencing a reference block in said window video sequence, said reference block associated with an adjusted motion vector by adding a navigation step vector to an associated motion vector.

18. The method for video navigation as described in claim 11, further comprising:
   contemporaneously, for each of said plurality of windows, transmitting said window video sequence to one of a plurality of remote clients.

19. The method for video navigation as described in claim 11, further comprising:
   contemporaneously, for each of said plurality of windows that is navigated, transmitting said window video sequence to one of said plurality of remote clients.

20. A communication network for presenting video, comprising:
   a video source for providing a live video sequence having dimension;
   a capture module coupled to said video source for capturing pixel information for said video sequence, forming a captured video sequence;
   a compression module coupled to said video source for compressing and encoding said video sequence in a compression format, forming a compressed video sequence; and
   a server coupled to said capture module and said compression module for receiving requests, from a plurality of client devices, for a plurality of portions of said video sequence, each of said plurality of portions corresponding to one of a plurality of cropped windows that are navigable in said video sequence, and contemporaneously transmitting each of said plurality of portions to one of a plurality of client devices.

21. The communication network for presenting video as described in claim 20, wherein said server further comprises:
   a pixel picture buffer adaptively coupled to said capture module for receiving said captured video sequence;
   a coded picture buffer adaptively coupled to said compression module for receiving said compressed video sequence; and
   a video cropping engine adaptively coupled to said pixel picture buffer and said coded picture buffer for generating each of said plurality of portions of said video sequence in said compression format by combining data from said compressed video sequence and said captured video sequence.

22. The communication network for presenting video as described in claim 20, wherein said server further comprises:
   a video cropping engine for receiving said requests for a plurality of portions of said video sequence, said requests including navigation control requests, each of which move one of said plurality of cropped windows from one location in said dimension to another location in said dimension.

23. The communication network for presenting video as described in claim 21, wherein said video cropping engine utilizes data from said compressed video sequence whenever possible in generating each of said plurality of portions, and substitutes data from said captured video sequence when necessary.

24. The communication network for presenting video as described in claim 20, wherein said video source is a stationary camera.

25. A computer system comprising:
a processor;
a computer readable memory coupled to said processor and containing program instructions that, when executed, implement a method for video navigation comprising:
a) forming a window in a video sequence having dimension corresponding to a first location within said dimension in response to a first request from a first client that is remotely located, wherein a size of said window is smaller than said dimension;
b) generating a first window video sequence from said video sequence, wherein said first window video sequence corresponds to said window at said first location, said first window video sequence having a first compression prediction following a compression format;
c) navigating said window from said first location to a second location in said dimension in response to a second request from said first client; and
d) generating a second window video sequence from said video sequence, wherein said second window video sequence corresponds to said window at said second location, said second window video sequence having a second compression prediction following said compression format.

26. The computer system as described in claim 25, wherein b) in said method for video navigation comprises:
b1) extracting from a compressed version of said video sequence prediction information for said window video sequence that independently complies with said compression format for said window; and
b2) substituting intra coded information that is coded from an uncompressed version of said video sequence in said compression format to complete said window video sequence.

27. The computer system as described in claim 25, wherein d) in said method for video navigation comprises:
d1) extracting from said first window video sequence prediction information based on blocks contained within said window at said second location for said second compression prediction; and
d2) substituting intra coded information that is coded from an uncompressed version of said video sequence in said compression format to complete said second window video sequence.

28. The computer system as described in claim 25, wherein d) in said method for video navigation comprises:
referencing a reference block in said second window video sequence, said reference block associated with an adjusted motion vector by adding a navigation step vector to an associated motion vector.

29. The computer system as described in claim 28, wherein d) in said method for video navigation further comprises:
referencing said reference block if said reference block is within a new motion vector search range corresponding to said window at said second location.

30. The computer system as described in claim 25, wherein said compression format is a Motion Picture Expert Group (MPEG) compression format.

31. The computer system as described in claim 25, wherein said method for video navigation further comprises:
sizing said first window within said dimension in response to said first request; and
locating said first window at said first location in response to said first request.

32. The computer system as described in claim 25, wherein said method for video navigation further
transmitting said second window video sequence to said first client for viewing.

33. The computer system as described in claim 25, wherein said method for video navigation further comprises:
e) contemporaneously forming a second window corresponding to a third location within said dimension in response to a third request from a second client that is remotely located;
f) contemporaneously generating a third window video sequence corresponding to said second window at said third location, said third window video sequence having a third compression prediction following said compression format; and
g) contemporaneously transmitting said second and third window video sequences to said first and second clients respectively for viewing.

34. The computer system as described in claim 25, wherein said method for video navigation further comprises:
e) contemporaneously forming a second window corresponding to a third location within said dimension in response to a third request from a second client;
f) contemporaneously navigating said second window from said third location to a fourth location in said dimension in response to a fourth request from said second client; and
g) contemporaneously generating a fourth window video sequence corresponding to said second window at said fourth location, said fourth window video sequence having a fourth compression prediction following said compression format.
h) contemporaneously transmitting said second and fourth window video sequences to said first and second clients for viewing.

* * * * *